324-
CROSS REFERENCE SEARCH ROOM

June 18, 1963 W. C. DERSCH 3,094,586

SIGNAL CONVERSION CIRCUITS

Filed Feb. 12, 1960 3 Sheets-Sheet 1

William C. Dersch,
*INVENTOR.*
*BY.*

Fraser and Bogucki

*ATTORNEYS*

SIGNAL CONVERSION CIRCUITS

Filed Feb. 12, 1960

3 Sheets-Sheet 2

William C. Dersch,
INVENTOR.
BY.
Fraser and Bogucki
ATTORNEYS

William C. Dersch,
*INVENTOR.*
*BY*
Fraser and Bogucki
*ATTORNEYS*

United States Patent Office 3,094,586
Patented June 18, 1963

3,094,586
SIGNAL CONVERSION CIRCUITS

William C. Dersch, Los Gatos, Calif., assignor to International Business Machines Corporation, New York, N.Y., a corporation of New York Filed Feb. 12, 1960, Ser. No. 8,339
7 Claims. (Cl. 179—1)

This invention relates to circuits for converting electrical signal manifestations of intelligence to a normalized form suitable for data processing, and more particularly to circuits for normalizing electrical signal representations of spoken words so as to minimize individual variations in pitch, amplitude and speech rate.

In a growing number of data processing applications, it is sought to process intelligence which is represented not by coded digital valued signals but by time varying electrical signals which characterize individual and unique manifestations out of a class of manifestations. The classes of manifestations which are referred to include written, printed or spoken characters or words. Considerable progress is being made, for example, in providing machines which can recognize printed characters by generating electrical signals which are representative of the characters, and then distinguishing factors in the signals which uniquely identify a particular character.

The problems involved in automatically identifying handwritten characters or spoken words are materially increased because of individual idiosyncrasies in handwriting and speech. Variations in the manner in which these manifestations originate, and in the manner in which they are translated into electrical signals, may be regarded for purposes of identifying the manifestations as noise effects. It is clear that any system which seeks to automatically recognize such manifestations should include some means for minimizing or compensating for material noise effects.

While the present invention may be employed with any electrical signal manifestations representative of intelligence, it is particularly useful in systems for automatically recognizing spoken words. The noise effects against which the human mind can distinguish but which immensely complicate the identification of a particular spoken word by automatic means include variations in amplitude (intensity), pitch and speed rate. While a person can readily identify a slowly spoken word which is voiced by a child as against a rapidly spoken version of the same word by a man or woman, the differences which are involved greatly complicate the problems of machine recognition. Accent and pronounciation variations also add to the problems, but those which are introduced by the emotional content of a message, or by the manner in which a word is used in a sentence may be regarded as lesser noise effects. Satisfactory recognition can be achieved if the problems introduced by amplitude, pitch and speech rate variations can be surmounted.

In attempting to minimize these noise effects, various attempts have been made to "normalize" the electrical signal representations of a spoken word. In some systems signals representing a spoken word have been normalized so that the voice resonances of a spoken word can be compared to a spectrum distribution representative of a standard word. Such normalizing systems are not suitable for use, however, in speech recognition systems which characterize a spoken word by amplitude and frequency modulation components at different frequency bands. A particularly promising form of the latter type of system, described in a concurrently filed application for patent entitled Intelligence Conversion System, by William C. Dersch, Ser. No. 8,368, filed February 12, 1960, derives amplitude and frequency waveforms or curves for each word, and displays the curves in such manner that they may be optically compared to reference patterns which identify different words. The versatility of such a system and its speed and resolution capabilities make possible the high speed recognition of a great many different words.

In the system described in the concurrently filed application, however, the amplitude and frequency waveforms which characterize a spoken word must be normalized for best identification. Where a visual display is used, the representations of any word should be a standard length, should have a selected average height, and should compensate for differences in pitch.

It is therefore an object of the present invention to provide improved circuits for converting electrical signal manifestations of intelligence to a normalized form.

Another object of the present invention is to minimize the effects of individual voice characteristics on the operation of a word recognition system.

A further object of the present invention is to provide improved circuits for normalizing representations of spoken words in their amplitude, pitch and speech rate characteristics.

Yet another object of the present invention is to provide an improved normalizing device for word recognition systems which operate by distinguishing amplitude and frequency modulation components in different frequency bands.

These and other objects of the present invention are met by an arrangement which senses the amplitude and frequency characteristics of a directly received representation of a spoken word and uses the sensed characteristics for normalization of the amplitude and frequency of a delayed representation of the spoken word. Further, the duration of the representation of the word is sensed, and the amplitude and frequency normalized representations are converted to a different time base so that they are also normalized in duration.

In accordance with a particular embodiment of the invention, the amplitude of a spoken word may be measured by averaging the amplitude of the envelope of audio signals representative of the word over a selected interval corresponding to the maximum duration of a word to be recognized. The audio signals are also applied to a delay circuit, and delayed by an interval of at least the expected maximum duration. The delayed version of the electrical signal representation of the word is then passed through a variable gain amplifier whose gain is governed by the averaged signal in a sense to counteract the differences of the average amplitude from a selected norm. A speech rate measurement is also made, and a rate (i.e. word duration) control signal is applied to control the gain of a second amplifier which amplifies compensated signals from the first variable gain amplifier. The second amplifier compensates for differences between actual speech rate and a selected normal rate. The result is that a complete normalization is obtained for amplitude characteristics to compensate for both loudly spoken short words as well as softly spoken long words. At the same time, the frequency modulation characteristics, i.e., the pitch, are converted to amplitude modulation characteristics, and a frequency control signal is generated which represents in amplitude and sense the compensation needed to normalize the frequency of the electrical signal representations of the spoken word. Amplitude and frequency waveforms may then be generated by application of the normalized amplitude signals to variable band-pass filters, each of which covers a different frequency band under control of the frequency control signal.

The signals passed by the variable band-pass filters may have their amplitude and frequency modulation components separately demodulated, to provide separate direct current signals whose amplitude variations with time provide the amplitude and frequency waveforms. Final normalization, according to word duration, is achieved by displaying the amplitude and frequency waveforms as visual representations along different time bases on a direct view storage tube. The time bases are adjusted to a selected length by a time base generator which is controlled by the rate control signal.

A better understanding of the invention may be had by reference to the following description, taken in conjunction with the accompanying drawing, in which like reference numerals refer to like parts and in which.

Figure 1:
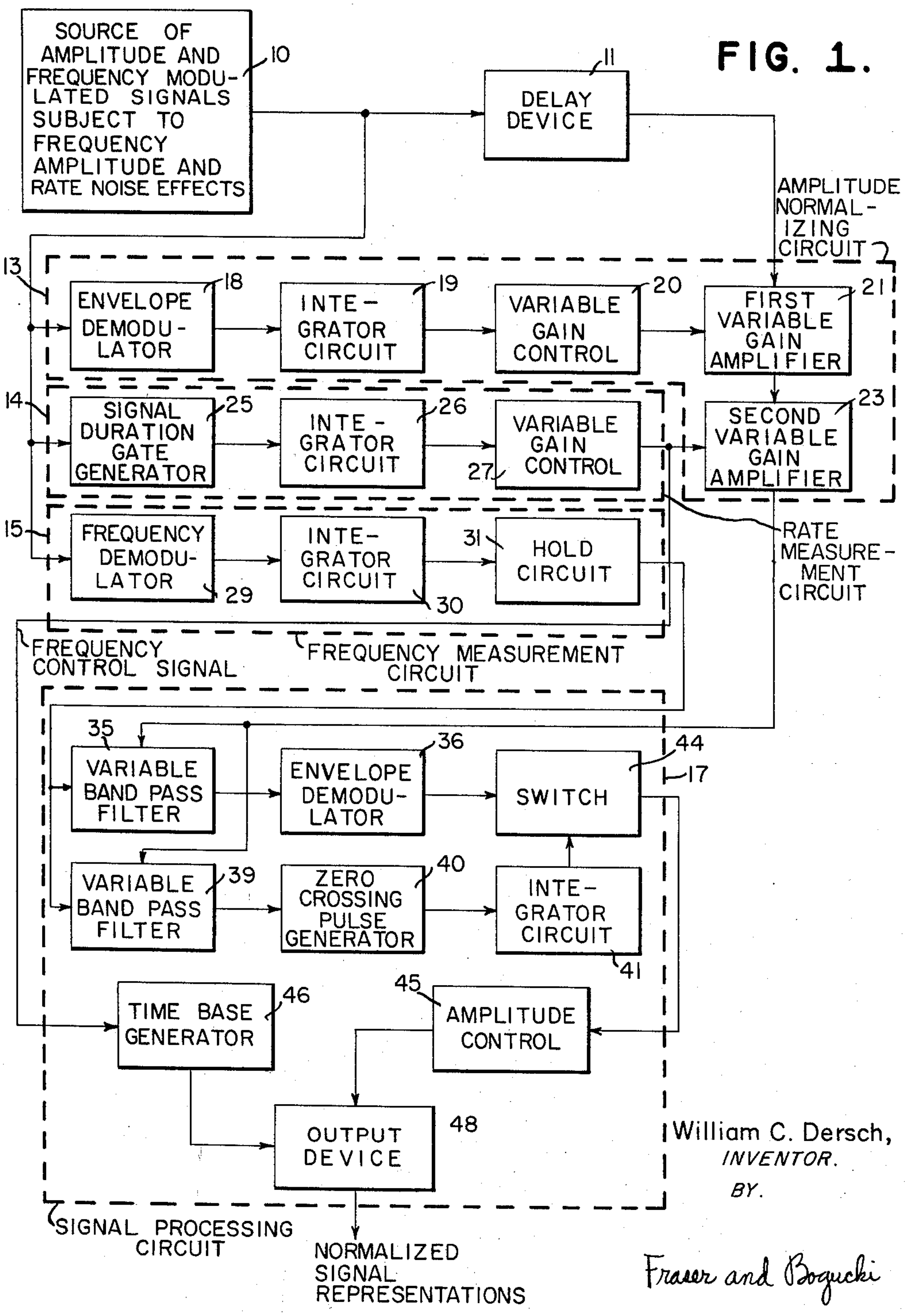
FIG. 1 is a block diagram representation of the principal elements of a system in accordance with the invention.

A system in accordance with the present invention, referring now to FIG. 1, operates in response to signals provided from a source 10, which signals include amplitude and frequency modulation components and are subject to frequency, amplitude and rate noise effects. The signals may represent individual manifestations of intelligence, such as spoken words. It may be assumed that each of the individual manifestations is of no greater than a selected maximum duration, and that the individual manifestations do not follow so rapidly that one is confused with another.

The input signals of varying duration from the source 10 are applied to a delay device 11, which provides a delayed version of the signal after a duration which is no less than the selected maximum duration of the different manifestations. Signals from the source 10 are also applied to an amplitude normalizing circuit 13, a rate measurement circuit 14 and a frequency measurement circuit 15 which operate in conjunction with the signal processing circuits 17 to minimize the noise effects present in the signals. The normalized amplitude signals which are to be passed or rejected by the variable band-pass filter 35 may vary widely in frequency, in accordance with the characteristic frequency of the manifestation. Accordingly, the frequency control signal from the frequency measurement circuit 15 adjusts the band-pass of the variable band-pass filter 35 so that the filter accepts a principal and useful frequency component of the input signals. An envelope demodulator 36 coupled to the variable band-pass filter 35 provides a direct current amplitude varying signal with time which accurately characterizes, for one frequency range, amplitude modulation components in the signals being analyzed. It will be recognized that the input signals and the manifestations which they represent are characterized also by the alternating current components which are passed by the variable band-pass filter 35.

Frequency modulation components of the input signal which lie in a selected frequency band are provided by a separate circuit which is responsive both to the output signals from the amplitude normalizing circuit 13 and to the frequency control signals from the frequency measurement circuit 15. The amplitude normalized signals are again passed selectively by a variable band-pass filter 39 under control of the frequency control signal.

Frequency modulation characteristics are identified in the form of an amplitude varying direct current signal by use of a zero crossing pulse generator 40 coupled to an integrator circuit 41. The zero crossing pulse generator 40 may be a monostable multivibrator, for example, which is biased so as to be triggered at each zero crossing of the alternating current signal from the variable band-pass filter 39. While the term "zero crossing" is sometimes taken to mean only the points at which an alternating current signal crosses its mean or zero axis, it is also interpreted as including points of slope reversal. As used herein, the term is intended to include both the axis crossing points and the slope reversal points. Where a single pulse generator may not be responsive to these conditions, a second pulse generator (not shown) may be used in conjunction with an integrator circuit which provides the derivative of the signal (and thus substitutes axis crossing points for slope reversal points) and the outputs of the two pulse generators may be combined in a logical gating network.

The pulses provided from the pulse generator 40 are of finite but relatively short duration, when compared to the total duration of the input signal being analyzed. A short term averaging of these signals by the integrator circuit 41 thus provides as an output signal a direct current signal whose amplitude varies with time in accordance with the frequency modulation characteristics of the input signal. This direct current signal further uniquely characterizes the initial manifestation.

The amplitude and frequency characteristics signals which are provided by this normalization arrangement may be separately utilized in different channels. To reduce the amount of equipment needed, however, the signals may be used on a time-shared basis through operation of a switch 44 to which both signals are applied. With audio signals the information rate is sufficiently low with respect to modern electronic switching speeds for the intelligence content to be substantially fully retained, and the time sharing technique may readily be employed.

Thus, there are available amplitude and frequency waveforms in the form of amplitude varying direct current signals representative of the input signals being analyzed. There is also available a rate control signal representative of the relationship between the actual duration of the input signals and a selected standard duration. By applying the amplitude and frequency waveforms to an amplitude control circuit 45, and the rate control signals to a time base generator 46, normalized signal representations may be provided by an output device 48 which is operated under control of the amplitude control 45 in the time base generator 46.

Many devices are available for providing recordation or signal conversion of amplitude varying signals with respect to a controllable time base, and only a few need be discussed by way of example. As described below in conjunction with FIG. 2, the time base generator 46 may be a variable scan control for a cathode-ray device to govern the time with which an electron beam is scanned, while the amplitude control 45 governs the deviation in the other coordinate from the base line. For some applications a digital device may be desired, and for these purposes the amplitude varying signals may be sampled at high speed and each sample may be converted by an analog-to-digital converter to digital values. The digital values may be stored and then read out at a different rate, in accordance with the signal provided from a time base generator, to provide normalized signal representations.

In summary, therefore, the arrangement of FIG. 1 operates by using the amplitude normalizing circuit 13, the rate measurement circuit 14 and the frequency measurement circuit 15 to analyze different characteristics of the signal from the source 10 which is representative of a manifestation of intelligence. Concurrently, the same signal is applied to a delay device 11, and the delayed version of the signal is processed in accordance with the analysis of the signal so as to provide a normalized representation of the original signal.

In the amplitude normalizing circuit 13, a first correction for average amplitude over a selected duration is made by detecting the envelope of the signal in an envelope demodulator 18, and averaging the signal in an integrator circuit 19. A variable gain control 20 adjusts the gain of a first variable gain amplifier 21 so as to normalize the delayed version of the signal with respect to the average amplitude. A second correction for actual duration within the selected interval is made in a second variable gain amplifier 23 utilizing the rate control signal derived from the rate measurement circuit 14.

The rate control signal is initiated by generating a gate signal in a duration gate generator 25, which gate signal defines a selected amplitude pulse which begins and ends with the signal from the source. The gate signal is no greater than the selected maximum duration and is averaged over the selected maximum duration in an integrator circuit 26, the output signals from which are applied to a variable gain control circuit 27 so as to maintain the rate control signal over the duration of the delayed version of the signal manifestation.

Frequency control signals representative of the deviation of the frequency of the signal manifestation from a selected norm, are derived from a frequency demodulator 29 in the frequency measurement circuit 15. An average signal derived from the integrator circuit 30 is maintained by a hold circuit 21 during the appearance of the delayed version of the signal manifestation.

A correction for the rate of delivery or presentation of the manifestation is not made in the signal processing circuit 17 until waveforms representing both amplitude and frequency characteristics of the input manifestations are derived in separate channels. In the amplitude channel, a variable filter 35 controlled in accordance with the actual frequency of the signal passes the normalized amplitude signal to an envelope detector 36 to provide a signal which characterizes the manifestation by amplitude varying components in a selected frequency band. For frequency component characterization, the amplitude normalized signals are provided to another variable band-pass filter 39, which again is controlled in frequency from the frequency measurement circuit 15, and the nature of the frequency modulation in the selected frequency band is established by a zero crossing pulse generator 40 and an integrator circuit 41. When time shared by a switch 44 and applied to the amplitude control 45 of an output device 48, these signals provide different but none the less unique characterizations of the intelligence represented by the signals from the source 10. For more accurate comparison and usage in associated systems, however, the time base generator 46 operating under control of the rate control signals from the rate measurement circuit 14 may control the output device 48 so that the fully normalized signal representations are provided.

It will be understood that manifestations represented in signal form from the source 10 might not, in practice, occur in periodic and well separated sequence. To avoid overlapping or confusion between a signal representation, its delayed version and succeeding signals, it may be desired to use the beginning and termination of a signal, as detected by the duration gate generator 25, to control the time of operation of the various variable gain controls 20, 27 and the hold circuit 31. Pulse generators and a gating network may be used for this purpose.

Figure 2:
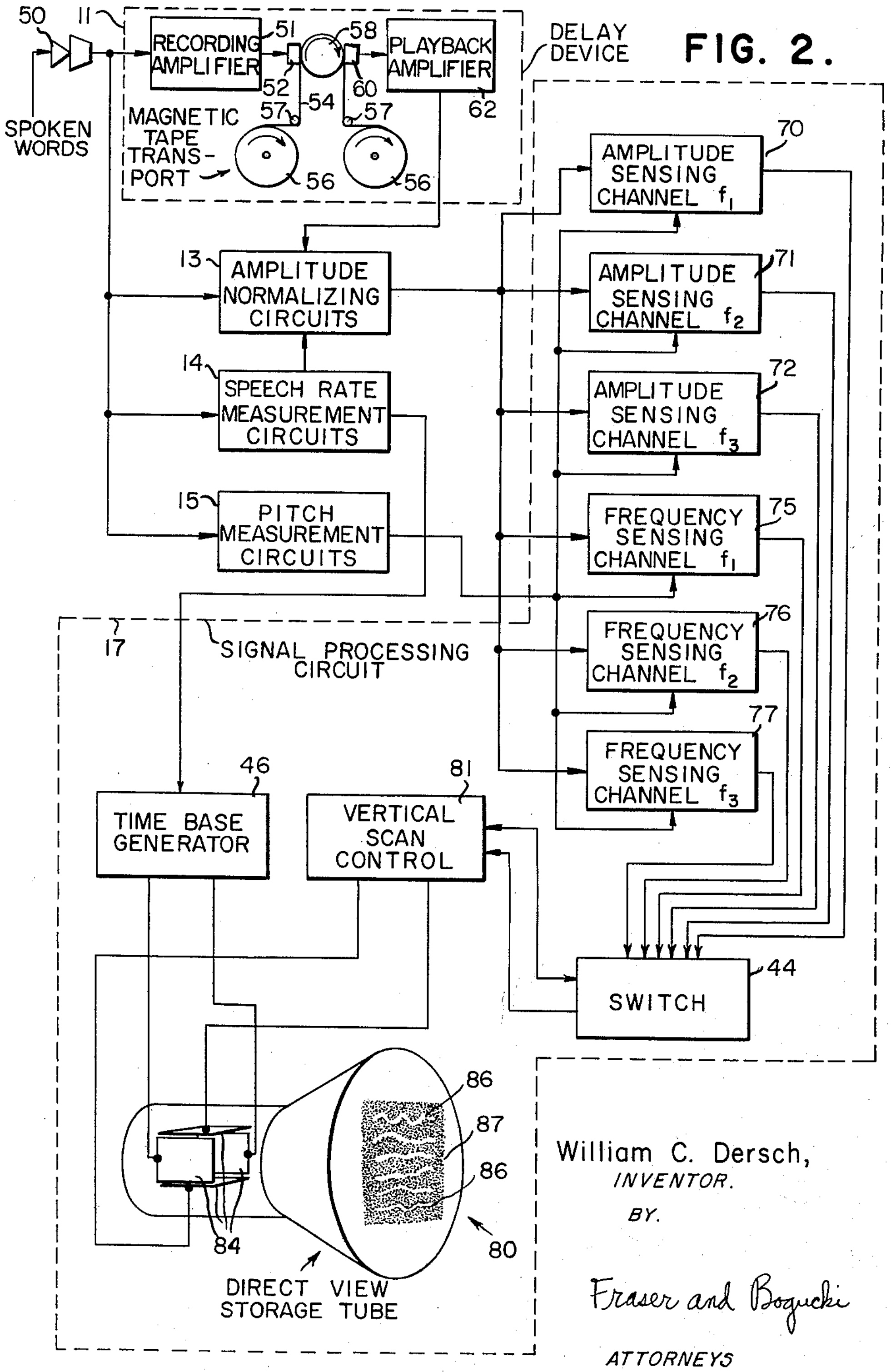
FIG. 2 is a block diagram representation of the principal elements of a system in accordance with the invention for providing normalized converted manifestations of different characteristics of spoken words.

A system for operation in accordance with the invention which is particularly useful in providing normalized signal representations of the intelligence contained in spoken words is shown in FIG. 2. In the arrangement of FIG. 2, the amplitude normalizing circuits 13, the speech rate measurement circuits 14 and the pitch measurement circuits 15 may correspond to like designated and disposed elements in FIG. 1, and need not be reviewed in detail. It should be noted, however, that the frequency measurement circuit of FIG. 1 is termed a pitch measurement circuit 15 in FIG. 2.

The manifestations of intelligence which are utilized in the arrangement of FIG. 1 are spoken words which are caused to excite a microphone 50. Output signals from the microphone 50 are applied to the normalizing and measurement circuits 13, 14 and 15, and also to a delay device 11, specifically a magnetic tape recording and reproduction system (indicated diagrammatically). The delay device 11 includes a recording amplifier 51 coupled to a recording transducer 52 which is positioned at a fixed point relative to a magnetic tape 54. A magnetic tape transport including a feed reel 55, a take-up reel 56 and idler rollers 57 moves the tape 54 past a guide roller 58. Only a simplified form of magnetic tape transport has been indicated, it being understood that a wide variety of mechanisms are available for this purpose. A playback transducer 60 is operatively associated with the tape 54 at a point which is spaced along the path of travel of the tape 54 at a selected distance from the recording transducer 52. The delay is selected to correspond to the duration of the longest word which the system is expected to process, this time equivalent being established by the speed of movement of the tape 54 and the spacing between the transducers 52 and 60.

The signal processing circuits 17 of the present arrangement represent a fuller version of the signal processing circuits of FIG. 1, and operate to provide six different outputs which fully and uniquely characterize a spoken word in a displayed form which is particularly suitable for optical recognition techniques utilizing standard reference patterns. What may be termed the normalized amplitude waveform generating circuits consist of three different amplitude channels 70, 71 and 72 for three different frequencies $f_1$, $f_2$ and $f_3$. Each of the amplitude sensing channels 70, 71 and 72 corresponds to the direct-current generating circuit including a variable band-pass filter and an envelope demodulator as described above in conjunction with FIG. 1. The variable band-pass of the amplitude sensing channels 70, 71 and 72 is controlled by a pitch control signal derived from the pitch measurement circuits 15. Each of the amplitude sensing channels therefore provides a direct current signal whose amplitude varies with time in accordance with the variations in the intensity of a different audio frequency components of the spoken, amplitude normalized word as represented by the signal components which are provided. Similarly, the information which characterizes the frequency modulation components of the spoken word is generated by three different frequency sensing channels 75, 76 and 77. Each of the frequency sensing channels covers a different frequency band, $f_1$, $f_2$ or $f_3$ within the spectrum of the words being analyzed. Each frequency sensing channel 75, 76 and 77 may correspond to the variable band-pass filter, zero crossing pulse generator and integrator circuit series in the arrangement of FIG. 1, and is controlled by the pitch control signal from the pitch measurement circuits 15. The three frequency bands for which frequency modulation components are sensed need not correspond to the three bands in which amplitude modulation components are sensed, although it should be recognized that if the frequencies $f_1$, $f_2$ and $f_3$ are the same in both instances a single variable band-pass filter can be used in each channel.

The six concurrently available normalized amplitude and normalized frequency waveforms may then be displayed on a time shared basis as standard length traces at different positions on the viewing surface of a direct view storage tube 80. The time sharing and the displacement of the traces in one coordinate may be accomplished by a switch 44 and a vertical scan control circuit 81 which are coupled to the vertical deflection plates 83 of the storage tube 80. Control of the horizontal scan may be accomplished by the time base generator 46, which may be a controllable sweep generator operating under control signals from the speech rate measurement circuits 14. Thus six vertically displaced (as seen in FIG. 2) patterns 86 corresponding to the amplitude variations with time of the different frequency and amplitude waveforms may be disposed on the viewing surface 87 on the storage tube 80 for each spoken word. The vertical scan control 81 establishes the base line or reference line for each waveform, and the instantaneous signals which are samples in each of the channels determine the vertical or amplitude variation of the individual trace relative to the base line.

Figure 3:
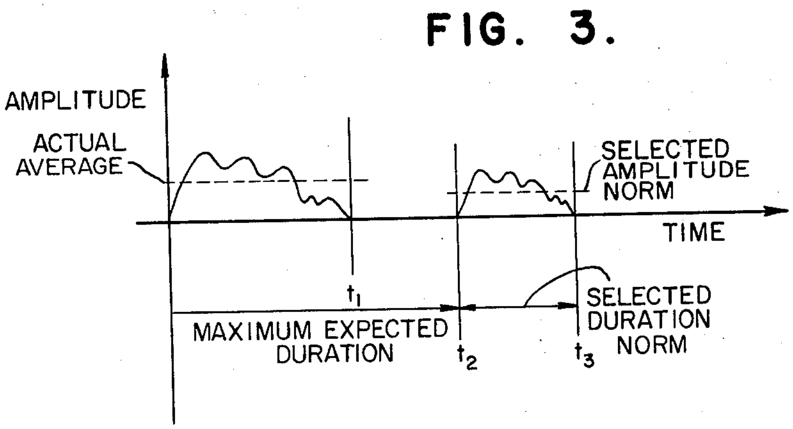
FIG. 3 is a representation of various waveforms which are useful in explaining the operation of the present invention.
Figure 4:
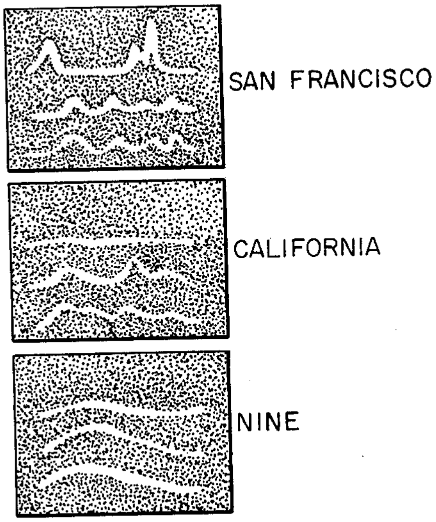
FIG. 4 is a representation of the manner in which manifestations representative of different characteristics of different words may be displayed.

The manner in which the arrangement of FIG. 2 operates upon a signal representation of spoken words to generate amplitude and pitch normalized signal representations, and then to generate unique signals which characterize the word by different amplitude and frequency modulation components at different frequencies, is illustrated in FIGS. 3 and 4. In FIG. 3, the principal amplitude modulation components of a given spoken word are illustrated as occurring between the times $t_0$ and $t_1$. A maximum duration of $t_2$ is assumed for the longest word which is to be recognized. The duration over which words are to be normalized is a time interval subsequent to $t_2$. This time interval need not follow immediately after $t_2$, but may occur some time thereafter. It is most convenient, however, to assume that the interval $t_2$–$t_0$ corresponds to the interval over which the words are delayed and that the normalized interval transpires between $t_2$ and $t_3$.

It is assumed in the present instance that the waveform represented in FIG. 3 between $t_0$ and $t_1$ corresponds to a word which is both longer and louder than the length and loudness norms which it is desired to utilize. In the functioning of the normalizing circuitry, therefore, the average amplitude extending over the interval $t_0$ to $t_2$ is reduced to a desired norm between $t_2$ and $t_3$, and the signal representation is effectively compressed in duration to the interval between $t_2$ and $t_3$. The frequency components are also similarly compressed into the time base from $t_2$ to $t_3$. It must be recognized that whether the arrangement of FIG. 1 or that of FIG. 2 is employed the representation of the interval between $t_2$ and $t_3$ has been modified to represent a time conversion process by which a normalized duration signal is immediately provided. Actually, of course, the normalization in duration or length may be accomplished electrically at some later time, or by visual means instead of electric means, as described in conjunction with FIG. 2.

The value of thus characterizing a given word by different amplitude and frequency waveforms from different frequency bands may better be understood by reference to FIG. 4, in which amplitude and frequency waveforms for three different words are represented. The curves of amplitude variations which are shown represent the components present in a given male voice for low frequencies of 0 to 1600 cycles, medium frequencies of 2000 to 3500 cycles and high frequencies of 5000 and over cycles, respectively. While each of these curves may individually be considered to characterize a given word, when taken together the curves uniquely and distinctly characterize the word. The recognition process is accordingly made much simpler, and may be accomplished at higher speed and with far greater accuracy than with techniques heretofore available. A most significant contribution to the efficency of the recognition system is the fact that amplitude, pitch and speech rate components in the spoken word have to a large extent been extent been minimized so that standard reference patterns can be formed and employed.

While there have been described above and illustrated in the drawings various forms in accordance with the invention for minimizing amplitude, frequency and rate noise effects in electrical signals which represent manifestations of intelligence, it will be appreciated that various alternatives may be employed. Accordingly, the invention should be considered as including all modifications and variations falling within the scope of the appended claims.

What is claimed is:

1. Apparatus for converting amplitude modulation characteristics present in a time varying electrical signal which represents a manifestation of intelligence to normalized amplitude modulation characteristics, including the combination of means for averaging the electrical signals, delay means responsive to the electrical signals and providing a delayed version of the electrical signals, first adjustable gain amplifier means coupled to receive the delayed version of the electrical signals and controlled in response to the averaged signals, means responsive to the electrical signals for measuring the duration of the electrical signals, and second adjustable gain amplifier means responsive to the signals from the first adjustable gain amplifier means and controlled by the duration measurement means.

2. Apparatus for converting the amplitude modulation characteristics of a time varying signal sequence of less than a selected duration to normalized amplitude modulation characteristics, including the combination of means responsive to the signal sequence for providing a delayed version thereof, the delay being at least as great as the selected duration, first and second variable gain amplifier means coupled to provide successive amplification of the delayed version of the signal sequence, means coupled to receive the time varying signal sequence responsive to the average amplitude thereof over the selected duration for controlling the first of the variable gain amplifier means, and means coupled to receive the time varying signal sequence and responsive to the actual duration thereof within the selected duration for controlling the gain of the second amplifier means.

3. Apparatus for converting the amplitude modulation characteristics of time varying electrical signals of different average amplitude and duration which represent manifestations of intelligence to normalized amplitude signals which are suitable for comparison to standard amplitude modulation characteristics, the apparatus including the combination of a delay device coupled to receive the electrical signals and providing a delay which is at least as great as the duration of the electrical signals which are expected to be longest in time, a first and a second variable gain amplifier means, the first variable gain amplifier means being coupled to receive signals to be amplified from the delay means, and the second variable gain amplifier means being coupled to receive signals to be amplified from the first variable gain amplifier means, means responsive to the electrical signals for providing direct current amplitude varying waveforms in response to the amplitude modulation characteristics thereof, an integrating circuit responsive to the direct current amplitude varying waveform for averaging the amplitude thereof over the selected duration, means responsive to the average amplitude signal thus provided for controlling the gain of the first variable gain amplifier means over the duration during which the delayed version of the electrical signals is provided, means responsive to the electrical signals for providing a rectangular pulse of the duration of the electrical signals, means responsive to the rectangular pulse for averaging the amplitude of the rectangular pulse with respect to the selected duration, and means responsive to the average duration signal thus provided for controlling the gain of the second variable gain amplifier means over the duration during which the delayed version of the electrical signals is provided.

4. A system for providing normalized representations of electrical signals which correspond to spoken words which are subject to amplitude, pitch and speech rate noise effects, including the combination of means for providing a delayed version of the electrical signals, means responsive to the electrical signals for amplifying the delayed version with a gain which is dependent upon the average amplitude of the signals over a selected duration, means for further controllably amplifying the delayed version of the signals in accordance with the relationship of the actual duration thereof to a selected duration, means responsive to the electrical signals for providing a pitch control signal indicative of the variation of the spoken word from a selected pitch, controllable frequency selective means responsive to the pitch control signal and coupled to receive the amplified signals for providing both amplitude and frequency normalized signals, and a variable time base generator responsive to the actual duration of the electrical signals within the selected duration for providing rate normalization thereof.

5. A system for normalizing electrical signal representations of spoken words to compensate for noise effects caused by amplitude, pitch and speech rate variations, including the combination of a delay device responsive to the electrical signals for providing a delayed version thereof after a selected duration, a rate measurement circuit responsive to the electrical signals and providing a rate control signal proportional to the difference between the actual duration of the electrical signals and a selected standard duration, and in a corresponding sense, an amplitude normalizing circuit coupled to receive the delayed version and responsive to the electrical signals and the rate control signal, the amplitude normalizing circuit including means for averaging the electrical signals over the selected duration and means for controllably amplifying the delayed version in accordance with the averaged signals and the rate control signal, a pitch measurement circuit responsive to the electrical signals and arranged to provide a pitch control signal representative of the average pitch of the spoken word, and a signal processing circuit coupled to the amplitude normalizing circuit, the rate measurement circuit and the pitch measurement circuit and including frequency sensitive demodulation circuits coupled to receive the amplified signals and controlled by the pitch control signals, and a variable time base generator coupled to adjust the duration of the demodulated signals to a selected duration.

6. A system for amplitude, pitch and speech rate normalizing of the electrical signal representations of spoken words, including the combination of means responsive to the electrical signal representations for providing a delayed version thereof, first variable gain means responsive to the electrical signal representations for variably amplifying the delayed version thereof in accordance with the average amplitude over a selected duration, second variable gain means coupled to amplify the signals from the first variable gain means, speech rate measurement means responsive to the electrical signal representations and coupled to vary the second variable gain means in accordance with the relation of the actual duration of the representations to the selected duration, pitch measurement means responsive to the electrical signal representations, and variable frequency selective means coupled to the second variable gain means and controlled by the pitch measurement means for deriving amplitude and pitch normalized signals, means coupled to the frequency selective means for demodulating the signals therefrom to provide amplitude and pitch normalized waveforms, and means coupled to the speech rate measurement means and to the means for demodulating for converting the amplitude and pitch normalized waveforms to a different representation with a controlled time base.

7. A system for normalizing electrical signal representations of manifestations of intelligence which are of no greater than a selected duration and which are subject to amplitude, frequency and duration variations, including the combination of means providing a delayed version of the electrical signal representations, means responsive to the electrical signal representations for variably amplifying the delayed version thereof in accordance with average amplitude, means responsive to the electrical signal representations for further variably amplifying the delayed version thereof in accordance with the actual duration to provide fully amplitude normalized signals, means responsive to the electrical signal representations for selecting particular frequency components of the fully amplitude normalized signals, and means responsive to the actual duration of the signal and to the selected frequency components for providing converted electrical signal representations against a standard time base.

References Cited in the file of this patent

UNITED STATES PATENTS

| | | |
|---|---|---|
| 2,635,146 | Steinberg | Apr. 14, 1953 |
| 2,705,742 | Miller | Apr. 5, 1955 |
| 2,799,734 | Camp | July 16, 1957 |
| 2,958,043 | Harding | Oct. 25, 1960 |